(12) United States Patent
Chin et al.

(10) Patent No.: US 8,798,030 B2
(45) Date of Patent: Aug. 5, 2014

(54) FACILITATING UPLINK SYNCHRONIZATION IN TD-SCDMA MULTI-CARRIER SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 12/909,723

(22) Filed: Oct. 21, 2010

(65) Prior Publication Data

US 2011/0249577 A1 Oct. 13, 2011

Related U.S. Application Data

(60) Provisional application No. 61/321,680, filed on Apr. 7, 2010.

(51) Int. Cl.
*H04W 56/00* (2009.01)

(52) U.S. Cl.
CPC .................................. *H04W 56/0005* (2013.01)
USPC ........................................................ 370/350

(58) Field of Classification Search
USPC ........................................................ 370/350
See application file for complete search history.

(56) References Cited

U.S. PATENT DOCUMENTS

2012/0087270 A1* 4/2012 Wan et al. ..................... 370/252

FOREIGN PATENT DOCUMENTS

| CN | 1728599 A | 2/2006 |
|---|---|---|
| CN | 1744463 A | 3/2006 |
| CN | 101075846 A | 11/2007 |
| CN | 100388647 C | 5/2008 |
| CN | 101370267 A | 2/2009 |
| CN | 101388722 A | 3/2009 |
| TW | 201004438 A | 1/2010 |
| WO | 0167620 A2 | 9/2001 |
| WO | 2004077919 A2 | 9/2004 |
| WO | 2006110774 A2 | 10/2006 |
| WO | 2010027186 A2 | 3/2010 |

OTHER PUBLICATIONS

Huawei, R1-092377, 'Issues in carrier aggregation', 3GPP TSG RAN WG1 Meeting #57bis, Jun. 29-Jul. 3, 2009, pp. 1-6.*
3GPP TS 25.221 V9.1.0 (Mar. 2010), Physical channels and mapping of transport channels onto physical channels (TDD), Release 9, pp. 1, 2, 76 and 77.*

(Continued)

*Primary Examiner* — Melvin Marcelo
(74) *Attorney, Agent, or Firm* — Kristine U. Ekwueme (57) ABSTRACT

Uplink synchronization processes in multi-carrier time division-synchronous code division multiple access (TD-SCDMA) systems include determining uplink transmission timing for a first carrier frequency and performing uplink synchronization on the other carrier frequencies based on the transmission timing of the first carrier frequency. The transmission timing may be adjusted based on a timing offset that is measured between the received downlink pilot signals of the various carrier frequencies. User equipment may perform uplink synchronization individually with each of the carriers serviced by a particular Node B after receiving synchronization information regarding those carrier frequencies.

24 Claims, 6 Drawing Sheets

(56) References Cited

OTHER PUBLICATIONS

Chuanfeng Li et al, "Influence of Introducing UppCH shifting and N Frequency functions on conformance testing of TD Terminal protocol", Telecommunication Network Technology, vol. 6 Jun. 1, 2007, pp. 13-16, XP002650466, China Retrieved from the Internet: URL:http://www.google.de/url"sa=t&source=web&cd=18& ved=0CGAQFjAH0Ao&url=http%3A%2F%2Fwww.1w23. com%2Fpdf_39e5e467-a6d7-436e-95a 8-47cfc0ac912d%2Flunwen.pdf&rct=j&q=N%E9%A 2%91%E7%82%B9TD-scdma%20%E4%B8%8A%E8%Al%8C%E5%90%8C%E6%AD% A5&ei=y0YeTrTlConr0dS9tKAD& usg=AFQjCNEbvfXTFBrC50Pohydf8eCoawWEIg&ca d=rja [retrieved on Jul. 14, 2011].

International Search Report and Written Opinion—PCT/US2011/031852—ISA/EPO—Aug. 4, 2011.

Ericsson et al: "Multiple Timing Advance, for Carrier Aggregation" 3GPP Draft; R2-101196—Multiple TA for CA, 3rd Generation Partnership Project (3GPP), Mobile Competence Centre; 650, Route des Lucioles; F-06921 Sophia-Antipolis Cedex; France, vol. RAN WG2, no. San Francisco, USA; 20100222, Feb. 16, 2010, XP050421769 [retrieved on Feb. 16, 2010] paragraphs [0001]-[02.2].

Taiwan Search Report—TW100112079—TIPO—Oct. 2, 2013.

* cited by examiner

FACILITATING UPLINK SYNCHRONIZATION IN TD-SCDMA MULTI-CARRIER SYSTEMS

CROSS REFERENCE TO RELATED APPLICATION

This application claims the benefit of U.S. provisional patent application No. 61/321,680 filed Apr. 7, 2010, in the names of CHIN et al., the disclosure of which is expressly incorporated herein by reference in its entirety.

BACKGROUND

1. Field

Aspects of the present disclosure relate, in general, to wireless communication systems, and more particularly, to facilitating uplink synchronization in TD-SCDMA multi-carrier systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method for uplink synchronization in a multi-carrier TD-SCDMA system includes determining uplink transmission timing for a first frequency in the multi-carrier TD-SCDMA system and performing uplink synchronization on at least one secondary frequency in the multi-carrier TD-SCDMA system based on the determined uplink transmission timing. It should be noted that, for purposes of this disclosure, the term "secondary frequency" means an additional frequency and is not intended to convey any type of hierarchical relationship with the recited first frequency.

In another aspect of the disclosure, a user equipment is configured to perform uplink synchronization in a multi-carrier TD-SCDMA system. The user equipment includes means for determining uplink transmission timing for a first frequency in the multi-carrier TD-SCDMA system and means for performing uplink synchronization on at least one secondary frequency in the multi-carrier TD-SCDMA system based on the determined uplink transmission timing.

In another aspect of the disclosure, a computer program product has a computer readable medium with program code stored thereon. The program code includes code to determine uplink transmission timing for a first frequency in the multi-carrier TD-SCDMA system and code to perform uplink synchronization on at least one secondary frequency in the multi-carrier TD-SCDMA system based on the determined uplink transmission timing.

In another aspect of the disclosure, a user equipment is configured for wireless communication in a multi-carrier TD-SCDMA system. The user equipment includes at least one processor and a memory coupled to the processor. The processor is configured to determine uplink transmission timing for a first frequency in the multi-carrier TD-SCDMA system and to perform uplink synchronization on at least one secondary frequency in the multi-carrier TD-SCDMA system based on the determined uplink transmission timing.

In another aspect of the disclosure, a method for uplink synchronization in a multi-carrier TD-SCDMA system includes transmitting synchronization information to a target cell for each of the multiple carrier frequencies serviced by the target cell. The synchronization information is received by the user equipment from a source cell. The method further includes receiving a Fast Physical Access Channel (FPACH) acknowledgement signal (ACK) associated with each frequency, obtaining individual transmission timing values from the received FPACH ACK for each frequency, and performing uplink synchronization individually on each of the multiple carrier frequencies serviced by the target cell.

In another aspect of the disclosure, a user equipment is configured for uplink synchronization in a multi-carrier TD-SCDMA system. The user equipment includes means for transmitting synchronization information, received from a source cell, to a target cell for each of the multiple carrier frequencies serviced by the target cell, means for receiving a FPACH ACK associated with each frequency, means for obtaining individual transmission timing values from the received FPACH ACK for each carrier frequency, and means for performing uplink synchronization individually on each carrier frequency serviced by the target cell.

In another aspect of the disclosure, a computer program product has a computer readable medium with program code stored thereon. The program code includes code to transmit synchronization information to a target cell for each frequency of a plurality of carrier frequencies serviced by the target cell, the synchronization information received from a source cell, code to receive FPACH ACK associated with each frequency, code to obtain individual transmission timing values from the received FPACH ACK for each frequency, and code to perform uplink synchronization individually on each carrier frequency serviced by the target cell.

In another aspect of the disclosure, a user equipment is configured for wireless communication in a multi-carrier TD-SCDMA system. The user equipment includes at least one processor and a memory coupled to the processor. The processor is configured to transmit synchronization information to a target cell for each frequency of a plurality of carrier frequencies serviced by the target cell. The synchronization information is received by the user equipment from a source cell. The user equipment is also configured to receive a FPACH ACK associated with each frequency, to obtain individual transmission timing values from the received FPACH ACK for each frequency, and to perform uplink synchronization individually on each carrier frequency serviced by the target cell.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
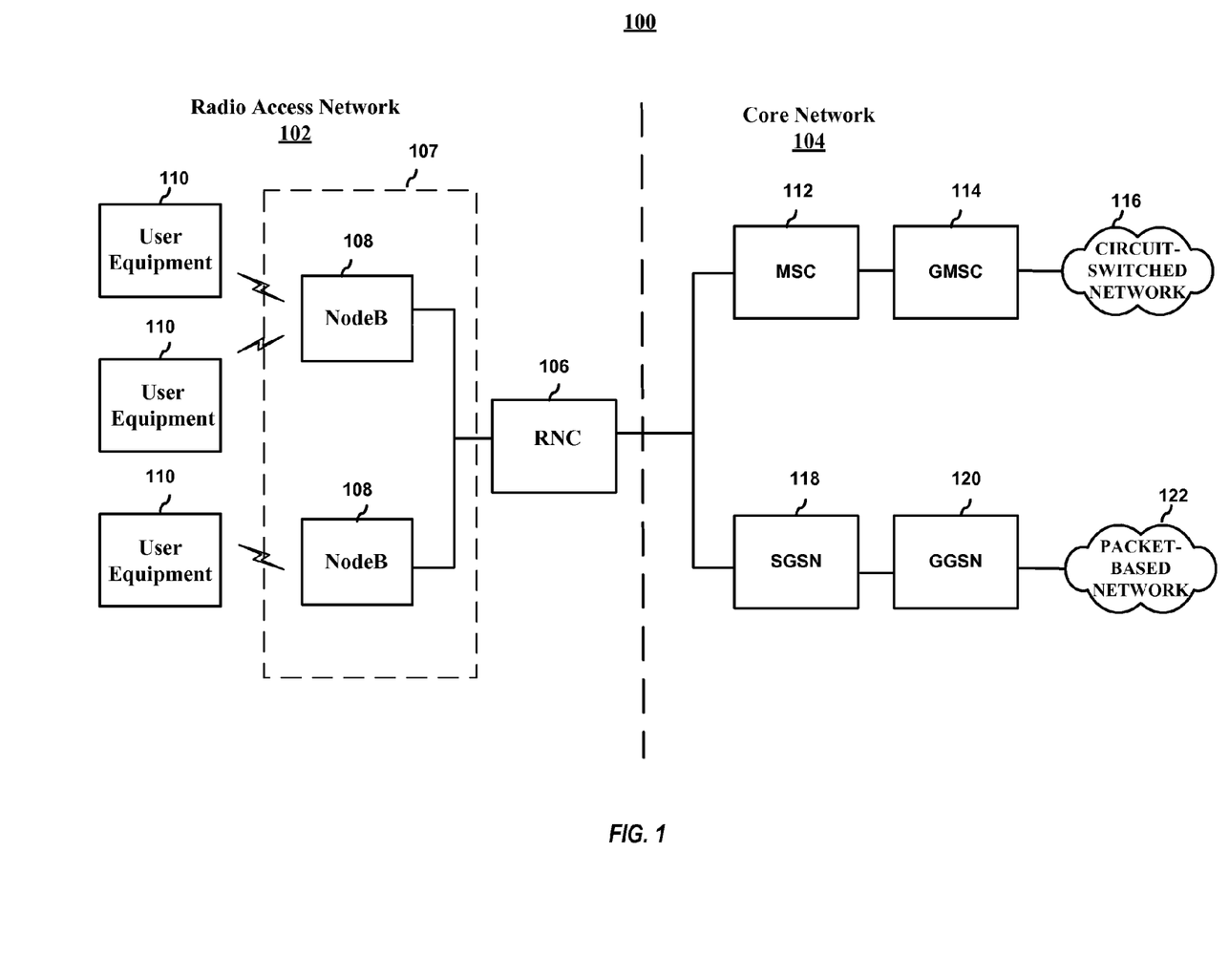
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
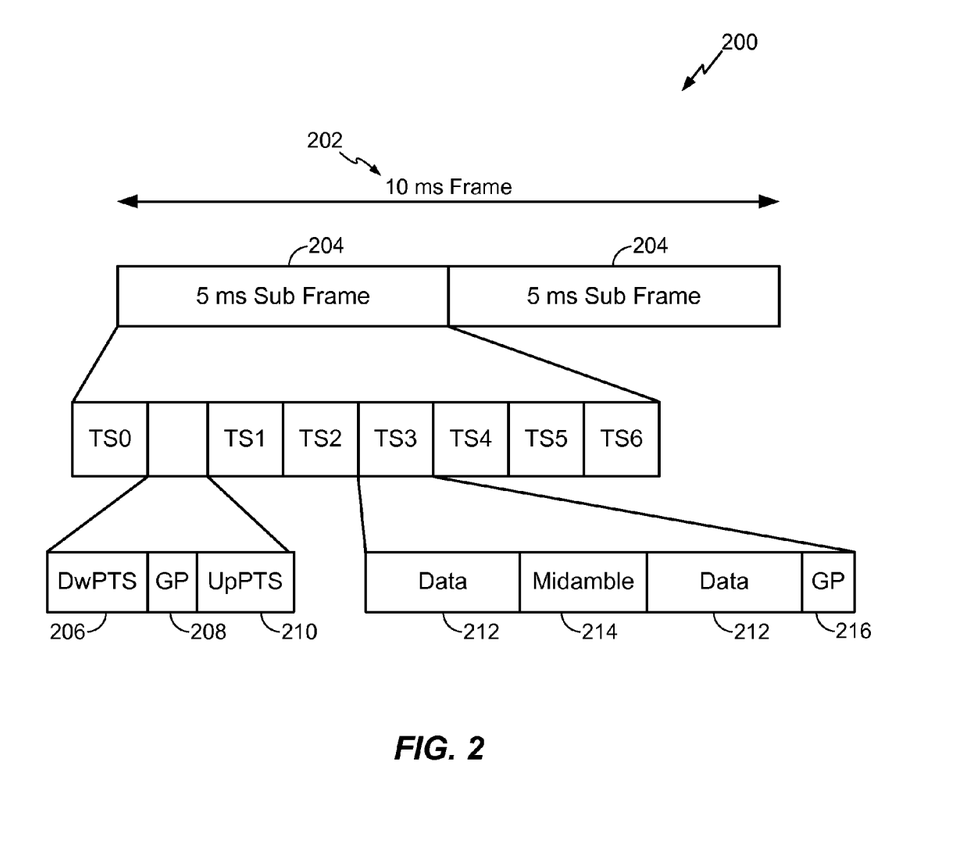
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206 (also known as the downlink pilot channel (DwPCH)), a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
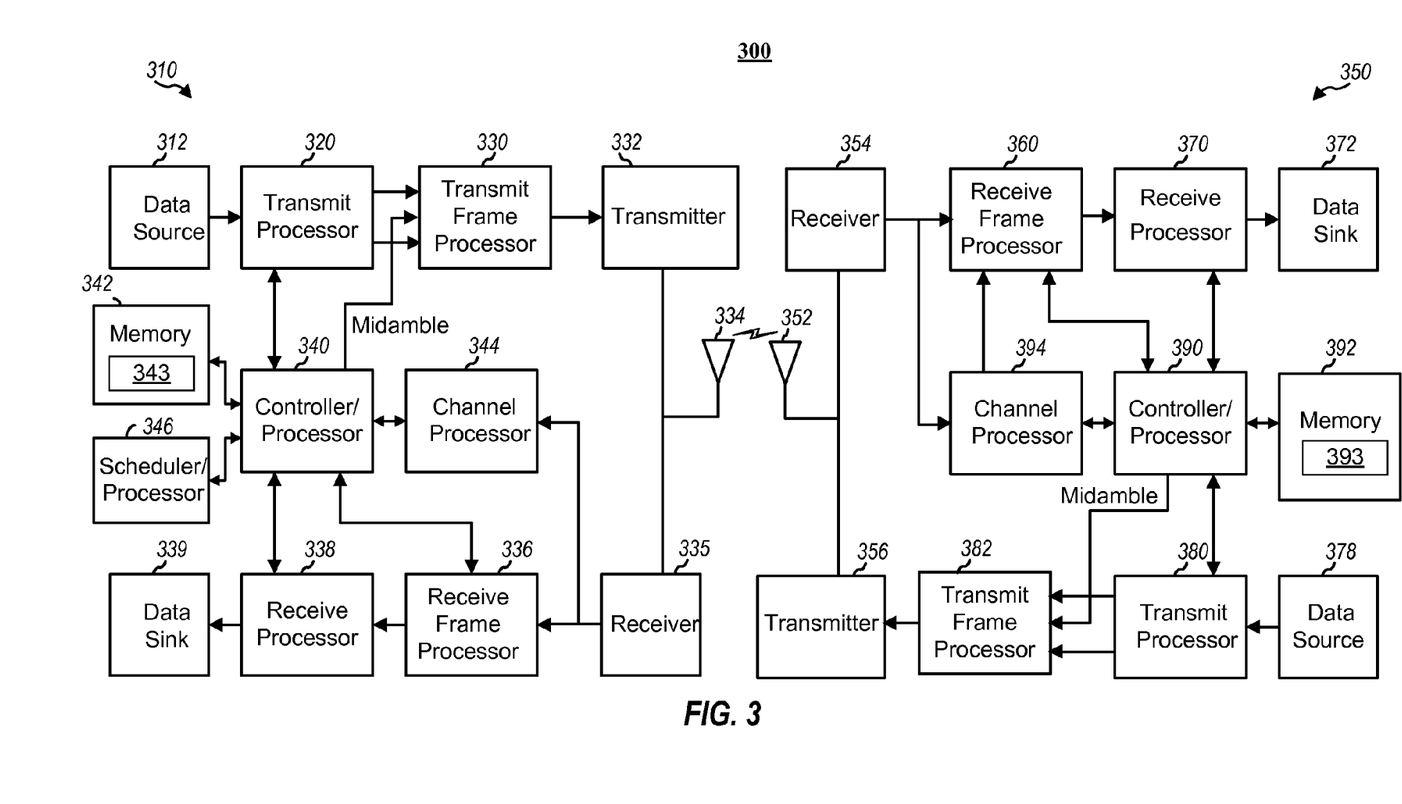
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 392 of the UE 350 includes a secondary carrier synchronization module 393 which, when executed by the controller/processor 390, configures the UE 350 to determine the transmission timing information that will be used to synchronize uplink communication from the UE 350 to the secondary carrier frequencies in a multi-carrier system. As noted above, for purposes of this disclosure, the term "secondary frequency" means another or additional frequency and is not intended to convey any type of hierarchical relationship with other frequencies. A scheduler/processor 346 at the Node B 310 may be used to allocate resources to the UEs and schedule downlink and/or uplink transmissions for the UEs.

It should be noted that in selected aspects of the present teachings, the memory 342 of the Node B 310 also stores a synchronization information registry 343, which includes records of the synchronization information for each of the carrier frequencies serviced by the surrounding Node Bs.

Figure 4:
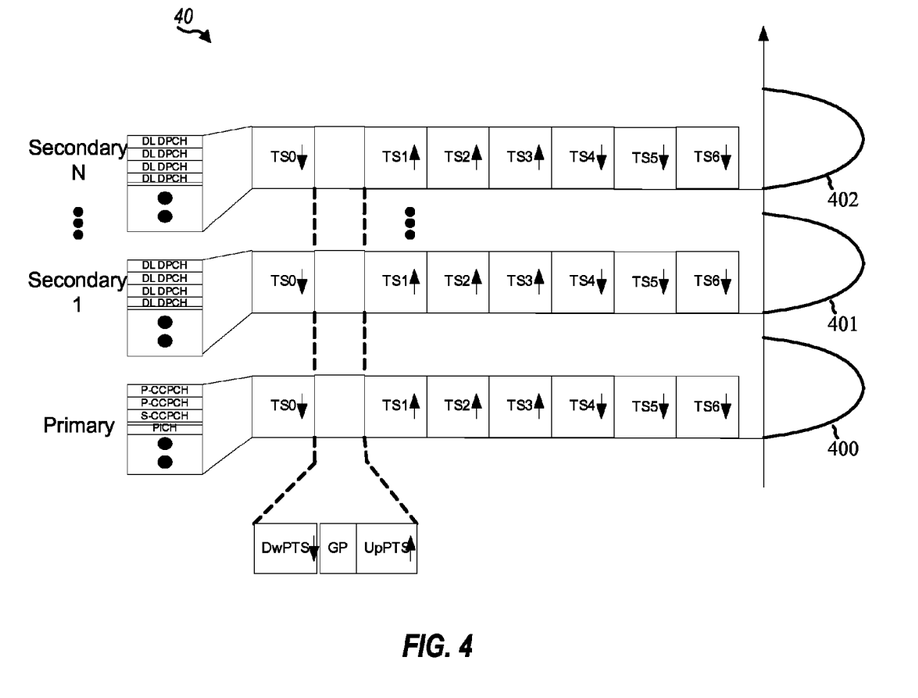
FIG. 4 is a block diagram illustrating carrier frequencies in a multi-carrier TD-SCDMA communication system.

In order to provide more capacity, the TD-SCDMA system may allow multiple carrier signals or frequencies. Assuming that N is the total number of carriers, the carrier frequencies may be represented by the set {F(i), i=0, 1, . . . , N–1}, where the carrier frequency, F(0), is the primary carrier frequency and the rest are secondary carrier frequencies. For example, a cell can have three carrier signals whereby the data can be transmitted on some code channels of a time slot on one of the three carrier signal frequencies. FIG. 4 is a block diagram illustrating carrier frequencies 40 in a multi-carrier TD-SCDMA communication system. The multiple carrier frequencies include a primary carrier frequency 400 (F(0)), and multiple secondary carrier frequencies, secondary 1 401 and secondary N 402 (F(1) and F(2)). In such multi-carrier systems, the system overhead may be transmitted on the first time slot (TS0) of the primary carrier frequency 400, including the Primary Common Control Physical Channel (P-CCPCH), the Secondary Common Control Physical Channel (S-CCPCH), the Pilot Indicator Channel (PICH), and the like. The traffic channels may then be carried on the remaining time slots (TS1-TS6) of the primary carrier frequency 400 and on the secondary carrier frequencies, secondary 1 401 and secondary N 402. Therefore, in such configurations, a UE will receive system information and monitor the paging messages on the primary carrier frequency 400 while transmitting and receiving data on either one or all of the primary carrier frequency 400 and the secondary carrier frequencies, secondary 1 401 and secondary N 402.

DwPTS and UpPTS may be configured on the primary carrier frequency 400 and the secondary carrier frequencies, secondary 1 401 and secondary N 402. However, a random access procedure may be performed with the primary carrier frequency 400, while the handover uplink synchronization procedure may be performed with either or both of the primary carrier frequency 400 and the secondary carrier, secondary 1 401 and secondary N 402.

One function of the UE in TD-SCDMA systems is uplink synchronization. The synchronous nature of TD-SCDMA systems provides that all uplink communications from each UE being served by a particular Node B are received simultaneously at the Node B. The UE, through synchronization messages and timing measurements, performs this uplink synchronization usually at two time periods: initial access and handover. During initial access, the UE receives timing information from the Node B through system information messages received via control channels and other system administrative channels. During a handover procedure, the UE first sends the uplink synchronization (SYNC_UL) code to the Node B and receives, via FPACH (Fast Physical Access Channel), an acknowledgement message (ACK) which indicates the timing information. In response to this timing information, the UE adjusts uplink transmission timing when switching the traffic channels to the target cell.

The available uplink synchronization codes and FPACH information are signaled by the source Node B. However, in multi-carrier TD-SCDMA systems, the uplink synchronization process may be more complicated—especially when the UE has dedicated traffic channels on more than one carrier frequency. In an initial access situation, because the control channels and other system administration channels are located on the primary carrier frequency, the UE can perform uplink synchronization with the primary carrier frequency but not the secondary carriers. Moreover, for handover procedures, the TD-SCDMA standards address uplink synchronization with a single frequency. Therefore, the UE will be unable to perform uplink synchronization with any channel located on a different frequency in the target cell.

Figure 5:
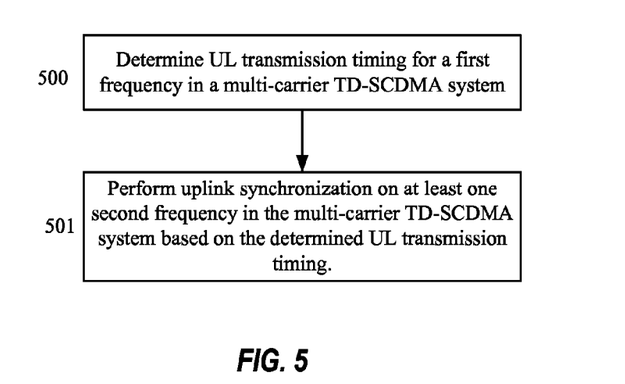
FIG. 5 is a functional block diagram illustrating example blocks executed to implement one embodiment of the present teachings.

FIG. 5 is a functional block diagram illustrating example blocks executed to implement one embodiment of the present teachings. In block 500, an uplink transmission timing is determined for a first frequency in the multi-carrier TD-SCDMA system. The uplink synchronization is then performed, in block 501, on at least one secondary frequency in the multi-carrier TD-SCDMA system based on the determined uplink transmission timing. In this aspect of the present teachings, the UE performs the uplink synchronization on the carrier frequency signaled by the Node B, and then applies that same uplink transmission timing for all of the carrier frequencies on which it will transmit uplink traffic.

In an alternative aspect of the present teachings, the timing offset for the additional carrier frequencies may be directly estimated and applied to uplink synchronization of the remaining carrier frequencies. In this alternative aspect, the UE can measure the timing offset of the received DwPTS on the frequency carrier F(j), and then perform the uplink synchronization on the remaining frequency carriers, F(k), that carry uplink traffic channels for the UE.

In obtaining the measured timing offset of the received DwPTS, the assumption is made that the measured timing offset, D(j,k), is greater than 0 when the DwPTS is received earlier on the carrier frequencies, F(j), than on the remaining carrier frequencies, F(k). The uplink transmission timing on F(k) should then be adjusted with an additional offset value defined as:

$$T\_adv(k) = T\_adv(j) + 2*D(j,k) \quad (1)$$

where T_adv(j) is the time advance value obtained using the received FPACH ACK when the uplink synchronization procedure is performed on the carrier frequency, F(j). T_adv(k) is derived from equation (1) by assuming the zero advancement is based on the DwPTS received on the same carrier frequency, F(k).

Figure 6:
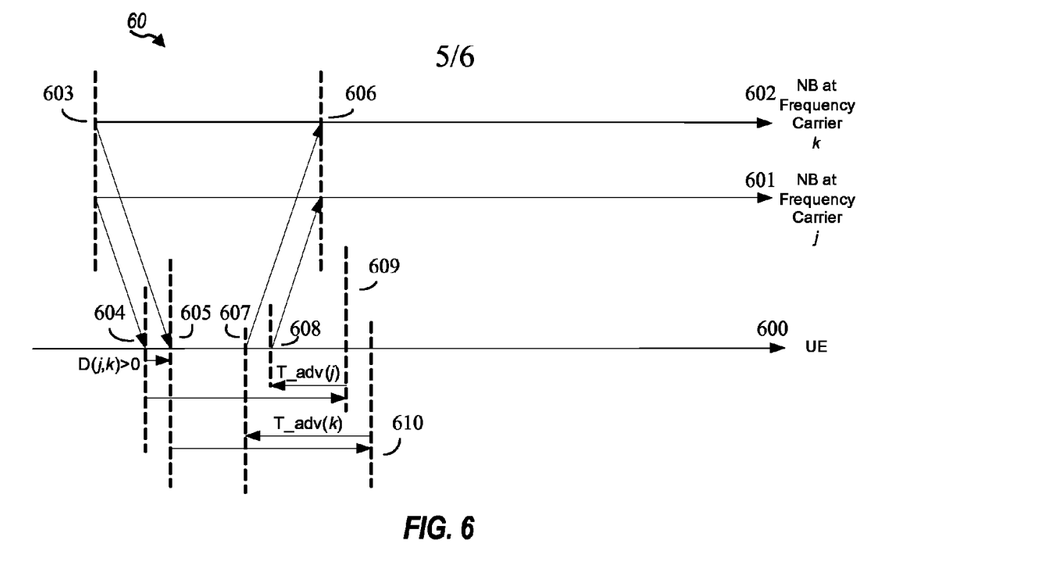
FIG. 6 is a signal flow diagram in a multi-carrier TD-SCDMA communication system configured according to one aspect of the present teachings.

FIG. 6 is a signal flow diagram in a multi-carrier TD-SCDMA communication system 60 configured according to one aspect of the present teachings. The multi-carrier TD-SCDMA communication system 60 includes a UE 600, a Node B carrier j 601, and a Node B carrier k 602. During the period illustrated in FIG. 6, the UE 600 has already performed an uplink synchronization with the Node B carrier j 601 and has, therefore, already received the uplink transmission timing for the Node B carrier j 601. Because the UE 600 can perform uplink synchronization with the single frequency of the Node B carrier j 601, it will determine the uplink transmission timing for the Node B carrier k 602 using the principles of equation (1).

Because uplink synchronization has already occurred with the Node B carrier j 601, the UE 600 already knows the time advance value, T_adv(j). Therefore, to derive the time advance value, T_adv(k), for the Node B carrier k 602, the UE 600 will measure the timing offset, D(j,k). At time 603, the DwPTS of Node B carrier j 601 and Node B carrier k 602 are transmitted to the UE 600. The UE 600 receives the DwPTS of Node B carrier j 601 at time 604 and receives the DwPTS of Node B carrier k 602 at time 605. The delay between times 604 and 605 constitutes the timing offset, D(j,k). Therefore, when scheduling uplink communication with Node B carrier k 602, the UE 600 will schedule transmission of its uplink communication at time 607, which is offset by timing offset, D(j,k), from the uplink transmission time 608 for communication transmitted to Node B carrier j 601.

For purposes of FIG. 6, the zero advancement reference for the carrier frequency, F(k), is based on the DwPTS received on the same frequency carrier F(k). The zero advancement for F(k) can be seen in the time period between time 605, when the UE 600 receives downlink communication from the Node B carrier k 602, and time 610. The zero advancement for F(j) can be seen in the time period between time 604, when the UE 600 receives downlink communication from the Node B carrier j 601, and time 609. The time advance value, T_adv(k), for the Node B carrier k 602 can then be seen as the timing measured from the zero advancement time 610 minus the time advance value, T_adv(j), plus two of the timing offsets located between times 607 and 608 and times 609 and 610. Once the UE 600 has determined the time advance value, T_adv(k), it may then synchronize its uplink communication with the Node B carrier k 602.

Figure 7:
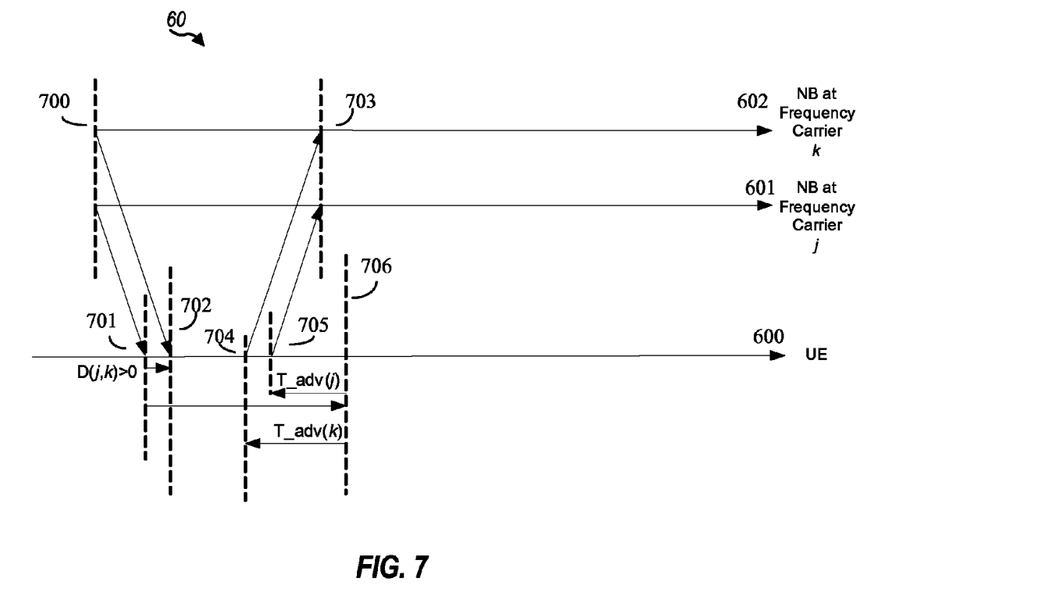
FIG. 7 is a signal flow diagram in the multi-carrier TD-SCDMA communication system configured according to one aspect of the present teachings.

It should be noted that, in alternative aspects of the present teachings, the zero advancement of the carrier frequency, F(k), may actually be based on the DwPTS received on the carrier frequency, F(j). FIG. 7 is a signal flow diagram in the multi-carrier TD-SCDMA communication system 60 configured according to one aspect of the present teachings. Again, for purposes of FIG. 7, uplink synchronization has already been completed between the UE 600 and the Node B carrier j 601. Therefore, the uplink transmission timing information for the Node B carrier j 601 has already been received. At time 700, both the Node B carrier j 601 and the Node B carrier k 602 transmit downlink communication to the UE 600. The UE 600 receives the downlink communication from the Node B carrier j 601 at time 701 and receives the downlink indication from the Node B carrier k 602 at time 702. The UE 600 measures this time difference between time 701 and time 702 as the timing offset, D(j,k). When scheduling uplink communication, the UE 600 schedules transmission of uplink communication to the Node B carrier k 602 at time 704 and to Node B carrier j 601 at time 705. The difference between times 704 and 705 is equal to the timing offset, D(j,k), measured on receipt of the downlink indications. In the aspect depicted in FIG. 7, the zero advancement reference is now at time 706 and is shared by both carrier frequencies, F(j) and F(k). Therefore, when deriving the time advance value, T_adv (k), for Node B carrier k 602 the calculations begin at time 706. By starting from the same reference point, only a single timing offset, D(j,k), is added to the time advance value, T_adv(j), of the Node B carrier j 601, defined as:

$$T\_adv(k) = T\_adv(j) + D(j,k) \quad (2)$$

Thus, the time advance value, T_adv(k), for the Node B carrier k 602 will be the reference time 706 minus the time advance value, T_adv(j), for the Node B carrier j 601 plus one timing offset, D(j,k). Once the time advance value, T_adv(k), for the Node B carrier k 602 has been determined, the UE 600 may synchronize uplink communication with the Node B carrier k 602 thereafter.

It should be noted that various aspects of the present teachings described with respect to FIGS. 6 and 7 perform the uplink synchronization in a handover process by deriving the uplink transmission timing for Node Bs having different carrier frequencies based, in part, on the uplink transmission timing known for the Node Bs with which uplink synchronization had already occurred. However, additional aspects of the present teachings may also provide for uplink synchronization on handover with Node Bs having multiple carrier frequencies through the receipt of uplink synchronization codes received from the source cells.

Figure 8:
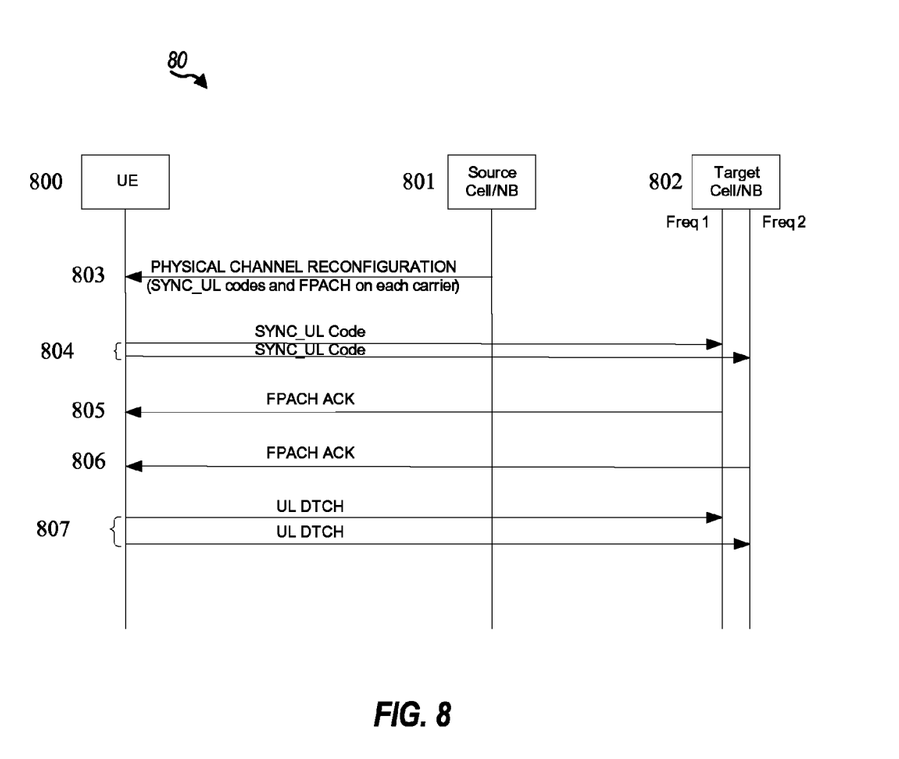
FIG. 8 is a call flow diagram illustrating a call flow during a hard handover in a TD-SCDMA system configured according to one aspect of the present teachings.

FIG. 8 is a call flow diagram illustrating a call flow during a hard handover in a TD-SCDMA system 80 configured according to one aspect of the present teachings. The TD-SCDMA system 80 includes a UE 800, a Node B 801, which has a single carrier frequency, and a Node B 802, which has two carrier frequencies, Freq 1 and Freq 2. A handover is initiated for the UE 800, in which the UE 800 will be handed over from the single, dedicated frequency of the Node B 801 to the Node B 802, which has multiple carrier frequencies, Freq 1 and Freq 2. The handover process begins with the Node B 801 transmitting a Physical Channel Reconfiguration message to the UE 800 at 803. The Physical Channel Reconfiguration message includes uplink synchronization codes and FPACH for each carrier frequency of the Node B 802. The UE 800, at 804, transmits the synchronization codes to the Node B 802 on each of the carrier frequencies, Freq 1 and Freq 2. The individual uplink transmission timing information for Freq 1 and Freq 2 are then transmitted by the Node B 802 back to the UE 800 at times, 805 and 806, respectively. The UE 800 may then use this uplink transmission timing information to complete uplink synchronization on each of the carrier frequencies, Freq 1 and Freq 2, and begin transmitting uplink dedicated transmission channels (DTCH) at time 807.

In one configuration, the UE includes means for determining uplink transmission timing for a first frequency in a multi-carrier TD-SCDMA system and means for performing uplink synchronization on at least one secondary frequency in the multi-carrier TD-SCDMA system based on the determined uplink transmission timing. In one aspect, the aforementioned means may be the controller/processor 390, the secondary carrier synchronization module 393 executed by the controller/processor 390 and stored on the memory 392, the channel processor 394, the antenna 352, the receiver 354, the receive frame processor 360, and the receive processor 370 configured to perform the functions recited by the aforementioned means. In another aspect, the aforementioned means may be a module or any apparatus configured to perform the functions recited by the aforementioned means.

In another configuration, the UE also includes means for measuring a timing offset on the first frequency and any secondary frequencies and means for adjusting the determined uplink transmission timing based on the measured timing offset before execution of the means for performing the uplink synchronization on the at least one secondary frequency. In one aspect, the aforementioned means may be the controller/processor 390, the secondary carrier synchronization module 393 executed by the controller/processor 390 and stored on the memory 392, the channel processor 394, the antenna 352, the receiver 354, the receive frame processor 360, and the receive processor 370 configured to perform the functions recited by the aforementioned means. In another aspect, the aforementioned means may be a module or any apparatus configured to perform the functions recited by the aforementioned means.

In another configuration, the UE also includes means for transmitting synchronization information to a target cell for all carrier frequencies serviced by the target cell, the synchronization information received from a source cell, means for receiving a FPACH ACK associated with each frequency, means for obtaining individual transmission timing values from the received FPACH ACK for each frequency, and means for performing uplink synchronization individually on each of the frequencies serviced by the target cell. In one aspect, the aforementioned means may be the controller/processor 390, the channel processor 394, the transmit processor 380, the transmit frame processor 382, the transmitter 356, and the antenna 352 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for uplink synchronization in a multi-carrier time division-synchronous code division multiple access (TD-SCDMA) system, said method comprising:
    performing uplink synchronization for a first frequency in said multi-carrier TD-SCDMA system to determine a first timing advance for said first frequency;
    receiving, at a first time, a first downlink transmission on said first frequency in said multi-carrier TD-SCDMA system;
    receiving, at a second time, a second downlink transmission on at least one secondary frequency in said multi-carrier TD-SCDMA system, in which said second time is different from said first time;
    measuring a timing offset as a difference between said first time and said second time;
    scheduling uplink transmissions on said first frequency at a third time based on the first timing advance; and
    scheduling uplink transmissions on said at least one secondary frequency at a fourth time that is offset from the third time by the timing offset.

2. The method of claim 1 further comprising:
    determining a second timing advance for said at least one secondary frequency; and
    adjusting said uplink transmission timing for communications on said at least one secondary frequency based on the second timing advance before performing said uplink synchronization on said at least one secondary frequency.

3. The method of claim 2 wherein said timing offset is measured using a downlink pilot timeslot (DwPTS) of said first frequency and said at least one secondary frequency.

4. A user equipment configured to perform uplink synchronization in a multi-carrier time division-synchronous code division multiple access (TD-SCDMA) system, said user equipment comprising:
    means for performing uplink synchronization for a first frequency in said multi-carrier TD-SCDMA system to determine a first timing advance for said first frequency;
    means for receiving, at a first time, a first downlink transmission on said first frequency in said multi-carrier TD-SCDMA system;
    means for receiving, at a second time, a second downlink transmission on at least one secondary frequency in said multi-carrier TD-SCDMA system, in which said second time is different from said first time;
    means for measuring a timing offset as a difference between said first time and said second time;
    means for scheduling uplink transmissions on said first frequency at a third time based on the first timing advance; and
    means for scheduling uplink transmissions on said at least one secondary frequency at a fourth time that is offset from the third time by the timing offset.

5. The user equipment of claim 4 further comprising:
    means for determining a second timing advance for said at least one secondary frequency; and
    means for adjusting said uplink transmission timing for communications on said at least one secondary frequency based on the second timing advance before performing said uplink synchronization on said at least one secondary frequency.

6. The user equipment of claim 5 wherein said timing offset is measured using a downlink pilot timeslot (DwPTS) of said first frequency and said at least one secondary frequency.

7. A computer program product having a non-transitory computer readable medium with program code stored thereon, said program code comprising:
    program code to perform uplink synchronization for a first frequency in said multi-carrier TD-SCDMA system to determine a first timing advance for said first frequency;
    program code to receive, at a first time, a first downlink transmission on said first frequency in said multi-carrier TD-SCDMA system;
    program code to receive, at a second time, a second downlink transmission on at least one secondary frequency in said multi-carrier TD-SCDMA system, in which said second time is different from said first time;
    program code to measure a timing offset as a difference between said first time and said second time;
    program code to schedule uplink transmissions on said first frequency at a third time based on the first timing advance; and
    program code to schedule uplink transmissions on said at least one secondary frequency at a fourth time that is offset from the third time by the timing offset.

8. The computer program product of claim 7 wherein said program code further comprises:
    program code to determine a second timing advance for said at least one secondary frequency; and
    program code to adjust said uplink transmission timing for communications on said at least one secondary frequency based on the second timing advance before performing said uplink synchronization on said at least one secondary frequency.

9. The computer program product of claim 8 wherein said timing offset is measured using a downlink pilot timeslot (DwPTS) of said first frequency and said at least one secondary frequency.

10. A user equipment configured for wireless communication in a multi-carrier time division-synchronous code division multiple access (TD-SCDMA) system, said user equipment comprising:
    at least one processor; and
    a memory coupled to the at least one processor, wherein the at least one processor is configured:
        to perform uplink synchronization for a first frequency in said multi-carrier TD-SCDMA system to determine a first timing advance for said first frequency;
        to receive, at a first time, a first downlink transmission on said first frequency in said multi-carrier TD-SCDMA system;
        to receive, at a second time, a second downlink transmission on at least one secondary frequency in said multi-carrier TD-SCDMA system, in which said second time is different from said first time;
        to measure a timing offset as a difference between said first time and said second time;
        to schedule uplink transmissions on said first frequency at a third time based on the first timing advance; and
        to schedule uplink transmissions on said at least one secondary frequency at a fourth time that is offset from the third time by the timing offset.

11. The user equipment of claim 10 wherein said at least one processor is further configured:
to determine a second timing advance for said at least one secondary frequency; and
to adjust said uplink transmission timing for communications on said at least one secondary frequency based on the second timing advance before performing said uplink synchronization on said at least one secondary frequency.

12. The user equipment of claim 11 wherein said timing offset is measured using a downlink pilot timeslot (DwPTS) of said first frequency and said at least one secondary frequency.

13. A method for uplink synchronization in a multi-carrier time division-synchronous code division multiple access (TD-SCDMA) system, said method comprising:
transmitting synchronization information to a target cell for each frequency of a plurality of carrier frequencies serviced by said target cell;
receiving a fast physical access channel (FPACH) acknowledgement signal (ACK) associated with said each frequency;
obtaining individual transmission timing values from said received FPACH ACK for said each frequency; and
performing uplink synchronization individually on said each frequency of said plurality of carrier frequencies assigned by said target cell.

14. The method of claim 13 further comprising:
initiating uplink traffic channels using said individual transmission timing values.

15. The method of claim 13 wherein said synchronization information comprises at least one of:
uplink synchronization codes; and
FPACH resources associated with said each frequency.

16. A user equipment for uplink synchronization in a multi-carrier time division-synchronous code division multiple access (TD-SCDMA) system, said user equipment comprising:
means for transmitting synchronization information to a target cell for each frequency of a plurality of carrier frequencies serviced by said target cell;
means for receiving a fast physical access channel (FPACH) acknowledgement signal (ACK) associated with said each frequency;
means for obtaining individual transmission timing values from said received FPACH ACK for said each frequency; and
means for performing uplink synchronization individually on said each frequency of said plurality of carrier frequencies assigned by said target cell.

17. The user equipment of claim 16 further comprising:
means for initiating uplink traffic channels using said individual transmission timing values.

18. The user equipment of claim 16 wherein said synchronization information comprises at least one of:
uplink synchronization codes; and
FPACH resources associated with said each frequency.

19. A computer program product having a non-transitory computer readable medium with program code stored thereon, said program code comprising:
program code to transmit synchronization information to a target cell for each frequency of a plurality of carrier frequencies serviced by said target cell;
program code to receive a fast physical access channel (FPACH) acknowledgement signal (ACK) associated with said each frequency;
program code to obtain individual transmission timing values from said received FPACH ACK for said each frequency; and
program code to perform uplink synchronization individually on said each frequency of said plurality of carrier frequencies assigned by said target cell.

20. The computer program product of claim 19 further comprising:
program code to initiate uplink traffic channels using said individual transmission timing values.

21. The computer program product of claim 19 wherein said synchronization information comprises at least one of:
uplink synchronization codes; and
FPACH resources associated with said each frequency.

22. A user equipment configured for wireless communication in a multi-carrier time division-synchronous code division multiple access (TD-SCDMA) system, said user equipment comprising:
at least one processor; and
a memory coupled to the at least one processor, wherein the at least one processor is configured:
to transmit synchronization information to a target cell for each frequency of a plurality of carrier frequencies serviced by said target cell;
to receive a fast physical access channel (FPACH) acknowledgement signal (ACK) associated with said each frequency;
to obtain individual transmission timing values from said received FPACH ACK for said each frequency; and
to perform uplink synchronization individually on said each frequency of said plurality of carrier frequencies assigned by said target cell.

23. The user equipment of claim 22 wherein said at least one processor is further configured:
to initiate uplink traffic channels using said individual transmission timing values.

24. The user equipment of claim 22 wherein said synchronization information comprises at least one of:
uplink synchronization codes; and
FPACH resources associated with said each frequency.

* * * * *